US008417663B2

(12) United States Patent
Cho et al.

(10) Patent No.: US 8,417,663 B2
(45) Date of Patent: Apr. 9, 2013

(54) MANAGING DIGITAL FILES IN AN ELECTRONIC DEVICE

(75) Inventors: Hyeyoun Cho, Seoul (KR); Huhn Kim, Seoul (KR); Sang Yeon Lim, Seoul (KR); Kyu Dae Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 696 days.

(21) Appl. No.: 12/099,066

(22) Filed: Apr. 7, 2008

(65) Prior Publication Data

US 2009/0070339 A1   Mar. 12, 2009

(30) Foreign Application Priority Data

Apr. 5, 2007   (KR) .................. 10-2007-0033817

(51) Int. Cl.
*G06F 7/00*   (2006.01)
*G06F 17/00*  (2006.01)

(52) U.S. Cl. ...................................................... 707/600

(58) Field of Classification Search .................. 707/600, 707/602, 661, 694, 736, 805; 369/30.08
See application file for complete search history.

(56) References Cited

U.S. PATENT DOCUMENTS

| | | | |
|---|---|---|---|
| 7,693,887 B2 * | 4/2010 | McLaughlin ................. 707/616 |
| 7,739,723 B2 * | 6/2010 | Rogers et al. ..................... 726/2 |
| 2002/0055934 A1 * | 5/2002 | Lipscomb et al. .......... 707/104.1 |
| 2002/0091848 A1 * | 7/2002 | Agresta et al. ................ 709/231 |
| 2002/0129036 A1 * | 9/2002 | Ho Yuen Lok et al. .... 707/104.1 |
| 2002/0174430 A1 * | 11/2002 | Ellis et al. ........................ 725/46 |
| 2003/0151618 A1 * | 8/2003 | Johnson et al. ............... 345/716 |
| 2003/0158737 A1 * | 8/2003 | Csicsatka ....................... 704/273 |
| 2004/0015517 A1 * | 1/2004 | Park et al. ................... 707/104.1 |
| 2004/0268413 A1 * | 12/2004 | Reid et al. ...................... 725/131 |
| 2005/0045373 A1 * | 3/2005 | Born .............................. 174/254 |
| 2005/0108413 A1 * | 5/2005 | Melmon ........................ 709/231 |
| 2006/0008256 A1 * | 1/2006 | Khedouri et al. ............. 386/124 |
| 2006/0026535 A1 * | 2/2006 | Hotelling et al. ............. 715/863 |
| 2006/0031551 A1 * | 2/2006 | Agresta et al. ................ 709/231 |
| 2006/0112335 A1 * | 5/2006 | Hofmeister et al. .......... 715/701 |

(Continued)

FOREIGN PATENT DOCUMENTS

| EP | 1160658 | 12/2001 |
|---|---|---|
| WO | 03058625 | 7/2003 |

*Primary Examiner* — Robert Beausoliel, Jr.
*Assistant Examiner* — Nicholas Allen
(74) *Attorney, Agent, or Firm* — Lee, Hong, Degerman, Kang & Waimey

(57) ABSTRACT

A file management method of a mobile terminal, the method including entering a mode configured to receive a file identifier, detecting the file identifier via an input device, associating the file identifier with the a file location in the mobile terminal, and detecting a selection of at least one file from a displayed file list, wherein the selected at least one file is accessible from the file location when an input value matches the file identifier. A mobile terminal for adding files includes a memory unit for storing a plurality of files and a file identifier set to correspond to a specific input signal, a display unit for displaying a list of files and file identifiers, the list comprising all or a specific category of the plurality of files and file identifiers, an input unit for selecting at least one file from the displayed file list and generating a specific input signal corresponding to the file identifier of the selected at least one file, a transceiving unit for communicating with a terminal, by sending and receiving files, and a controller for adding the selected at least one file to a file location associated with the specific input signal.

19 Claims, 26 Drawing Sheets

U.S. PATENT DOCUMENTS

| | | | |
|---|---|---|---|
| 2006/0195480 A1* | 8/2006 | Spiegelman et al. | 707/104.1 |
| 2006/0195521 A1* | 8/2006 | New et al. | 709/204 |
| 2006/0235550 A1* | 10/2006 | Csicsatka et al. | 700/94 |
| 2006/0253874 A1* | 11/2006 | Stark et al. | 725/62 |
| 2006/0267995 A1* | 11/2006 | Radloff et al. | 345/530 |
| 2007/0004459 A1 | 1/2007 | Aarnio | |
| 2007/0048714 A1* | 3/2007 | Plastina et al. | 434/308 |
| 2007/0083553 A1* | 4/2007 | Minor | 707/104.1 |
| 2007/0162502 A1* | 7/2007 | Thomas et al. | 707/104.1 |
| 2007/0239687 A1* | 10/2007 | Seymour | 707/3 |
| 2007/0299875 A1* | 12/2007 | Lee et al. | 707/104.1 |
| 2008/0065700 A1* | 3/2008 | Lim | 707/200 |
| 2008/0092046 A1* | 4/2008 | Bae | 715/716 |

* cited by examiner

< Before adding >                < After adding >

MANAGING DIGITAL FILES IN AN ELECTRONIC DEVICE

CROSS-REFERENCE TO RELATED APPLICATIONS

Pursuant to 35 U.S.C. §119(a), this application claims the benefit of earlier filing date and right of priority to Korean Application No. 10-2007-0033817, filed on Apr. 5, 2007, the contents of which are hereby incorporated by reference herein in its entirety.

BACKGROUND OF THE INVENTION

1. Field of the Invention

This document relates to a mobile terminal and adding digital content using the mobile terminal.

2. Discussion of the Related Art

An increase in demand for mobile terminals has lead to an integration of various digital media such as photographs, pictures, videos, and music, in addition to general voice telephony. The integration of digital music with a mobile terminal has proliferated through the use of Playlists, wherein several Playlists may be created such that a user may listen to music on a per-Playlist basis.

However, adding a specific music file to a specific Playlist in the mobile terminal requires navigating several menus. For example, prior art methods require a user to select an option menu, a Playlist addition menu, and select and store a specific Playlist among displayed Playlists. Thus, the user has a very inconvenient experience.

The user's inconvenience is not limited to adding music files to Playlists. A user faces problems similar to those mentioned above when adding files to locations such as a folder, an internal memory, or an external memory. Thus there is a need to provide a user with a convenient method for managing files in a mobile terminal.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a file management method of a mobile terminal is provided. The method includes entering a mode configured to receive a file identifier, detecting the file identifier via an input device, associating the file identifier with the a file location in the mobile terminal, and detecting a selection of at least one file from a displayed file list, wherein the selected at least one file is accessible from the file location when an input value matches the file identifier.

In one feature, the file location includes one of a Playlist and a memory location. A new file location is assigned to the input value if the input value does not match the file identifier and a title of the new file location is user selectable.

In one feature, the file location includes one of a Playlist and a memory location. A new file location is assigned to the input value if the input value does not match the file identifier and a title of the new file location is user selectable.

In another feature, the method further includes displaying a plurality of file items with corresponding file identifiers. Additionally, the input device includes one of a keypad and touch screen. Furthermore, the file location is associated with a file organization of multimedia files.

In yet another feature, the method further includes displaying a plurality of file items and file identifiers for selection by a user. The selection of the at least one file comprises using a drag and drop of one of the plurality of file items to a desired file identifier if the input device comprises a touch screen and the input value is recognized from contact on the touch screen that displays the file list.

In accordance with another embodiment, a mobile terminal for adding files is provided. The mobile terminal includes a memory unit for storing a plurality of files and a file identifier set to correspond to a specific input signal, a display unit for displaying a list of files and file identifiers, the list comprising all or a specific category of the plurality of files and file identifiers, an input unit for selecting at least one file from the displayed file list and generating a specific input signal corresponding to the file identifier of the selected at least one file, a transceiving unit for communicating with a terminal, by sending and receiving files, and a controller for adding the selected at least one file to a file location associated with the specific input signal.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
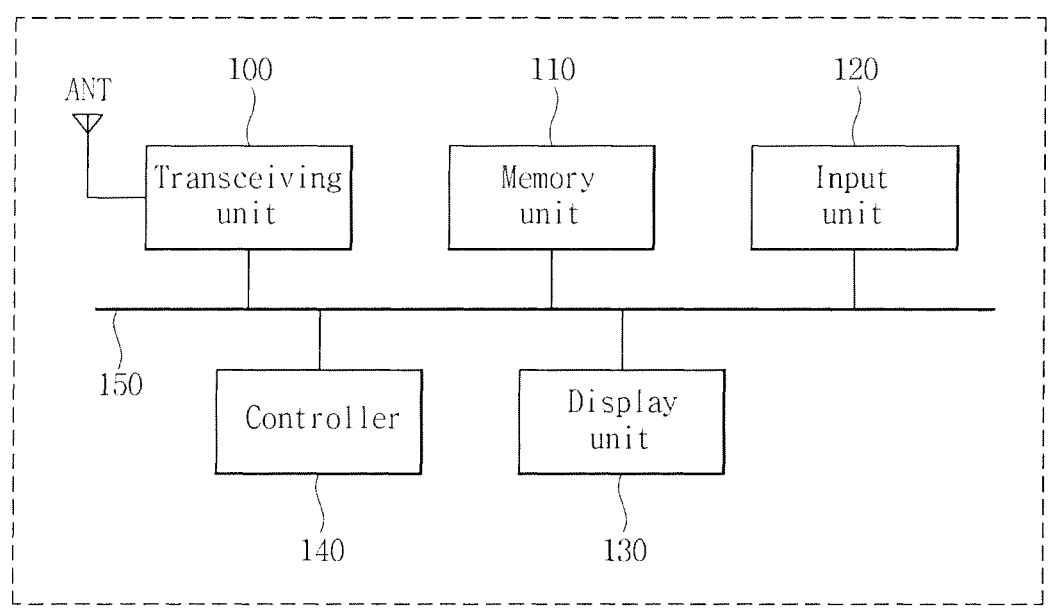
FIG. 1 is a block diagram illustrating an implementation of architecture of a mobile terminal according to an embodiment of the present invention.

FIG. 1 is a block diagram illustrating an implementation of architecture of the mobile terminal 10 according to an embodiment of the present invention. As shown in FIG. 1, the mobile terminal 10 may be a mobile communication device. The mobile terminal 10 includes a transceiving unit 100, a memory unit 110, an input unit 120, a display unit 130, and a controller 140. The respective elements may be connected using a bus 150.

The transceiving unit 100 communicates with a base station via an antenna (ANT) and receives various files, including music, image, and video, via the antenna (ANT).

The memory unit 110 may include a flash memory, a Random Access Memory (RAM), or an Electrically Erasable Programmable Read Only Memory (EEPROM). The memory unit 110 stores a predetermined program for controlling a general operation of the mobile communication terminal 10. The memory unit 110 stores a plurality of files, including music, image, and video. Also, the memory unit 110 stores information on a specific position that is set to correspond to a specific input signal of the input unit 120.

The input unit 120 includes numeral keys and a variety of function keys. The input unit 120 selects a list of files. The files may be selected from all or a specific category of files stored in the memory unit 110. The input unit 120 selects any one or more file and generates a specific input signal for the selected file.

The display unit 130 displays each variety of information signal received from the transceiving unit 100. The display unit 130 may display a list of files of all or a specific category selected through the input unit 120.

The controller 140 includes a Mobile Station Modem (MSM) and controls general input/output of the mobile terminal 10. In one embodiment of the present invention, where one or more files are selected through the input unit 120 from among the list of files displayed on the display unit 130, upon generation of a specific input signal, the controller 140 controls and adds the selected file(s) to a specific position that corresponds to the specific input signal.

Figure 2:
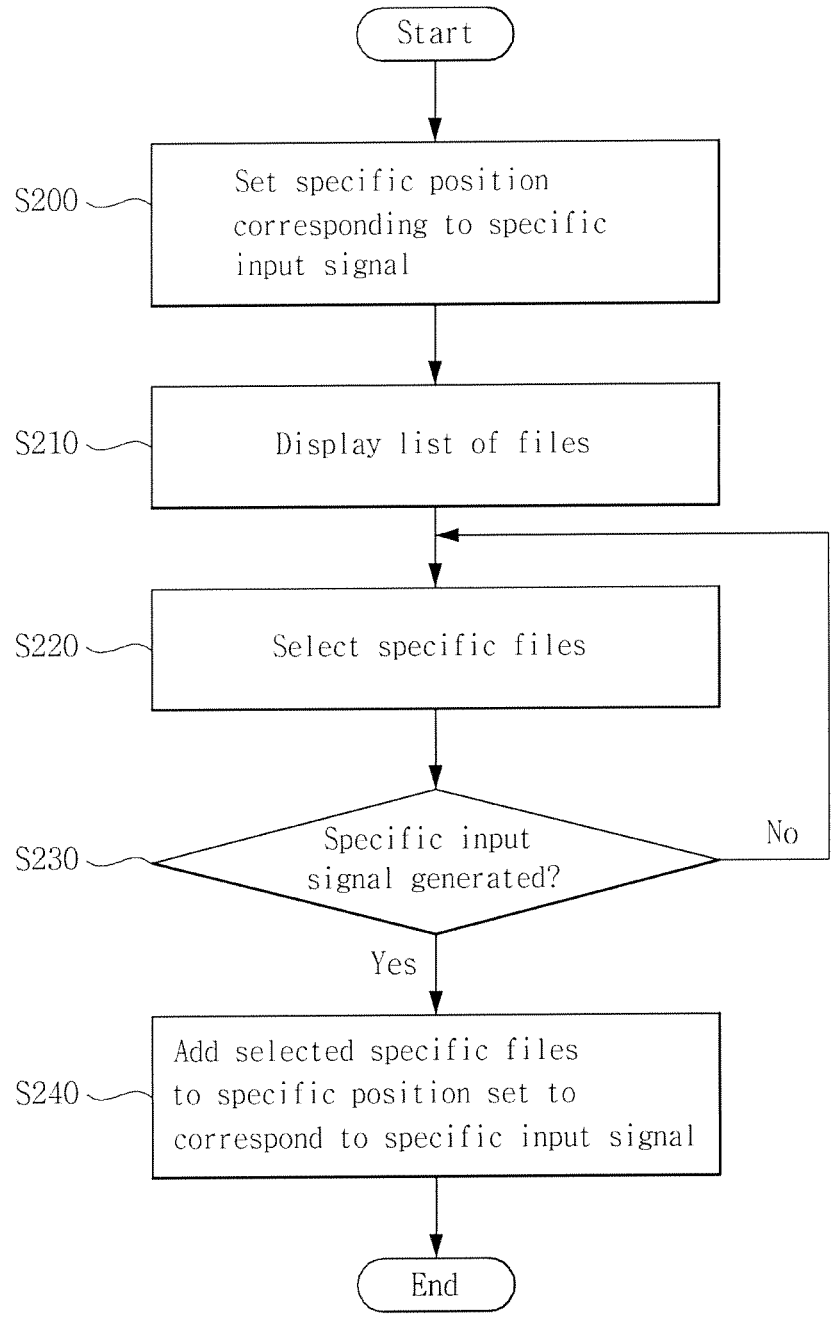
FIG. 2 is a flowchart illustrating an implementation of a method for adding files using a mobile terminal according to an embodiment of the present invention.
Figure 3:
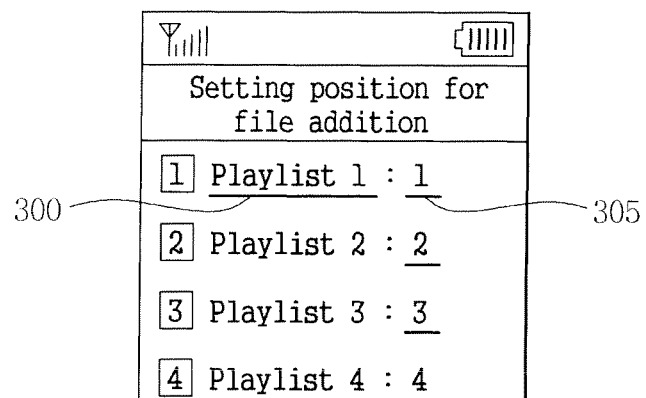
FIG. 3 is a diagram illustrating an example of setting a specific position corresponding to a specific input signal according to an embodiment of the present invention.

FIG. 2 is a flowchart illustrating an implementation of a method for adding files using the mobile terminal 10. FIG. 3 is a diagram illustrating an example of setting a specific position corresponding to a specific input signal.

As shown in FIG. 2, the file addition method includes setting a specific position corresponding to a specific input signal (Step 200), displaying a list of files (Step 210), selecting a file from the displayed file list (Step 220), checking whether a specific input signal for the selected file is generated (Step 230), and adding the selected file to a specific position that corresponds to a specific input signal (Step 240).

If the input unit 120 is a key type, as shown in FIG. 3, a menu for "setting position for file addition" is selected through the input unit 120. Accordingly, the controller 140 displays a name of a specific position 300 for file addition on the display unit 130. The controller 140 controls the display unit 130 such that a specific input 305 corresponding to a specific position 300 may be set through the input unit 120.

The term "specific position" refers to a position at which selected files may be added. For example, a specific position may be a Playlist to which a file is added. A Playlist represents a list for grouping and playing a plurality of music files stored in the memory unit 110.

Accordingly, Playlists 1, 2, 3, and 4 each may be formed such that music files may be grouped and played according to a user's desire. For example, a user may select all music which is good for exercising, as music files stored in "Playlist 1". After a user associates certain music files with "Playlist 1," the display unit 130 displays only a list of music files corresponding to the "Playlist 1" when "Playlist 1" is selected.

The specific input 305 may be set through the input unit 120 to add files to a Playlist. If desired, a specific input 305 may be input using numeral keys when the input unit 120 is a keypad.

A specific input 305 of the input unit 120 that serves to associate a file with "Playlist 1" may be set as a numeral key "1". A specific input 305 of the input unit 120 that serves to associate a file with "Playlist 2" may be set as a numeral key "2". A specific input 305 of the input unit 120 that serves to associate a file with "Playlist 3" may be set as a numeral key "3". A specific input 305 of the input unit 120 that serves to associate a file with "Playlist 4" may be set as a numeral key "4". The same principle applies to setting the specific input 305 corresponding to the specific position 300 and setting the specific position 300 corresponding to the specific input 305.

Figure 4A:
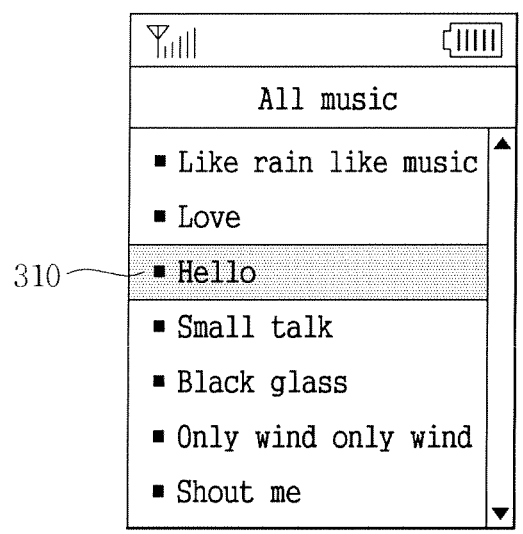
FIGS. 4A to 4C are diagrams illustrating examples of adding a file to a Playlist in response to a specific input signal according to an embodiment of the present invention.
Figure 4B:
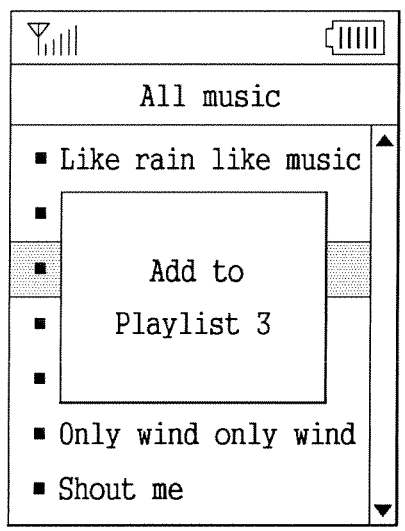
Figure 4C:
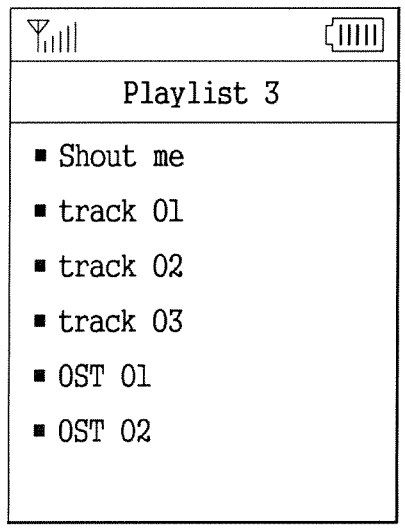
Figure 4C:
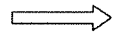
Figure 4C:
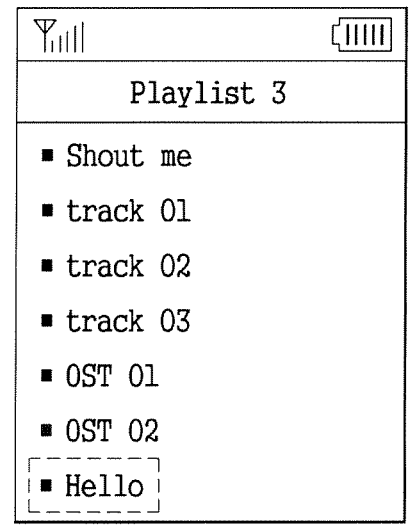

FIGS. 4A to 4C are diagrams illustrating examples of adding files to a Playlist in response to a specific input signal. As shown in FIG. 4A, a menu of "all music" is selected through input unit 120. The controller 140 displays a list all music files stored in the memory unit 110 on the display unit 130 (Step 210).

FIG. 4A illustrates, selecting a music file named "Hello." Files are selected by moving a selection bar 310 and selecting a file on which the selection bar 310 is positioned. The controller 140 checks whether a specific input signal is generated (Step 230). As shown in FIG. 4B, when a numeral key "3" of the input unit 120 is selected, the controller 140 adds the "Hello" music file to "Playlist 3" (Step 240). Accordingly, as shown in FIG. 4C, the controller 140 has added the "Hello" music file to "Playlist 3".

Figure 5:
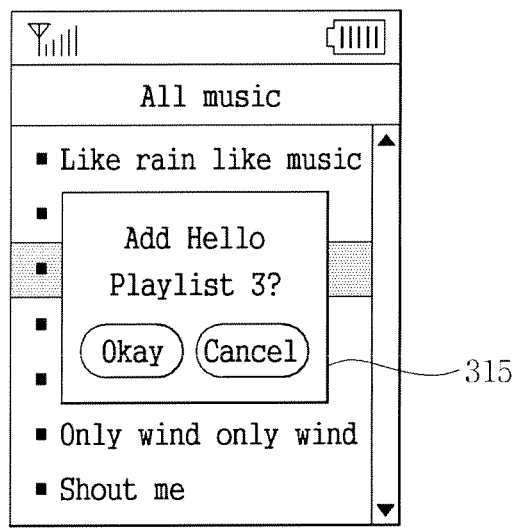
FIG. 5 is a diagram illustrating an example of selectively adding a file to a Playlist according to an embodiment of the present invention.

FIG. 5 is a diagram illustrating an example of selectively adding files to a Playlist. A numeral key "3" is selected through the input unit 120 when the "Hello" file is selected as shown in FIG. 4A.

As shown in FIG. 5, the controller 140 displays a message window 315 with a message of "Add 'Hello' to 'Playlist 3'?" on the display unit 130. If the user intends to add the music file to the corresponding position, "Okay" is selected. Otherwise, "Cancel" is selected.

In the current embodiment of the present invention, when specific music files are selected, a position to which the selected music files may be added is displayed. An example is illustrated in FIGS. 6A to 6C.

Figure 6A:
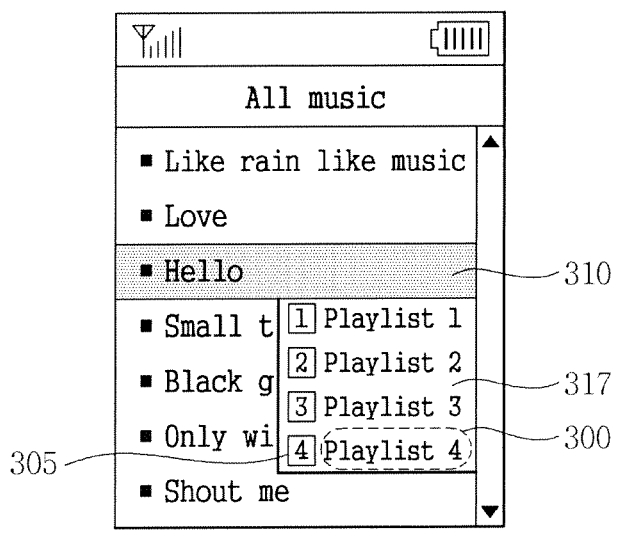
FIGS. 6A to 6C are diagrams illustrating examples of displaying an addition position guide at one side of selected files according to an embodiment of the present invention.
Figure 6B:
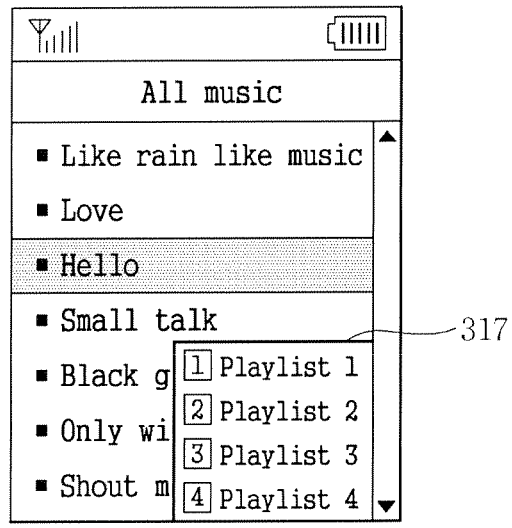
Figure 6C:
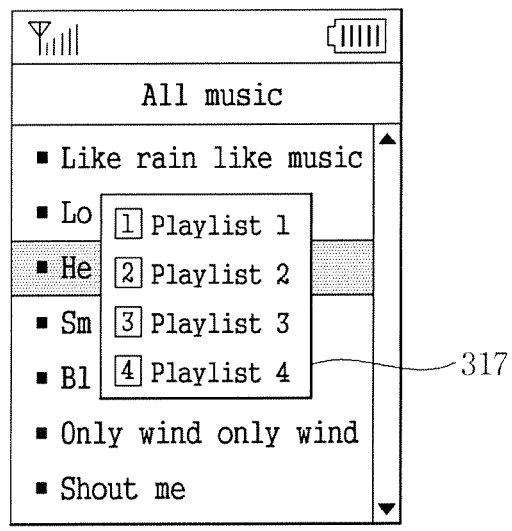

FIGS. 6A to 6C are diagrams illustrating examples of displaying an addition position guide at one side of selected file. As shown in FIG. 6A, the "Hello" file is selected through the input unit 120 when all music files are displayed on the display unit 130. Accordingly, the controller 140 displays a name of a specific position 300 for file addition and an addition position guide 317 representing specific inputs 305 of the input unit 120, each specific input corresponding to a name of a specific position 300. The addition position guide 317 may be formed in a position adjacent or close to a selection bar 310.

As shown in FIG. 6B, the controller 140 may display the addition position guide 317 at one side of the display unit 130. In an alternate embodiment, as shown in FIG. 6C, the controller 140 may display the addition position guide 317 on the display unit 130 in a pop-up window form. The addition position guide 317 may be configured according to a user's setting.

The above implementation is a description of selecting a specific file, selecting a specific numeral key of the input unit 120, and inputting a specific input. However, it is not intended to limit the scope of the present invention. In other words, a specific input may be a non-preset input. An example of a non-present input is illustrated in FIGS. 7A to 7D.

Figure 7A:
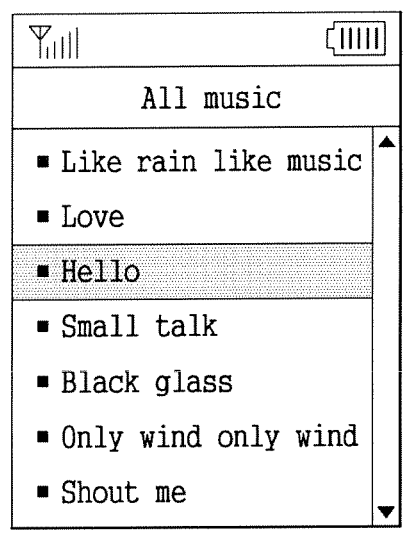
FIGS. 7A to 7D are diagrams illustrating examples of creating a Playlist and changing a name of a Playlist according to an embodiment of the present invention.
Figure 7A:
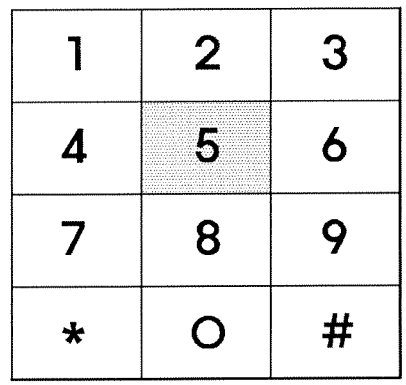

FIGS. 7A to 7D are diagrams illustrating examples of creating a Playlist and changing a name of a Playlist. As shown in FIG. 7A, the "Hello" file may be selected through the input unit 120 when all music files are displayed on the display unit 130. Then, a numeral key "5" is selected through the input unit 120.

Figure 7B:
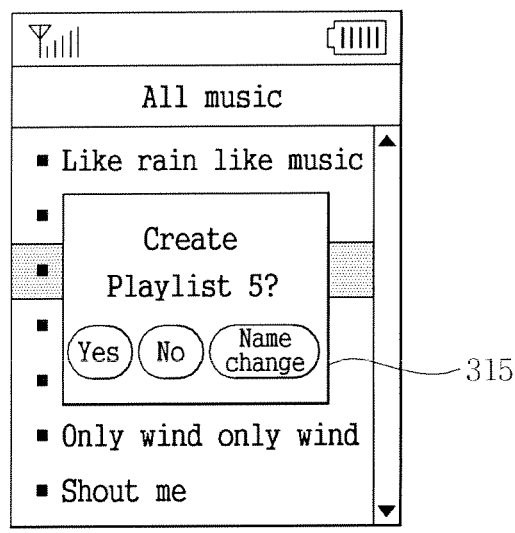

For example, as illustrated in FIG. 7A, numeral key "5" is selected. If numeral key "5" is not associated with a Playlist, the controller 140 will create a new Playlist. Therefore, as shown in FIG. 7B, the controller 140 displays a message window 315 with a message of "Create Playlist 5?" on the display unit 130.

Figure 7C:
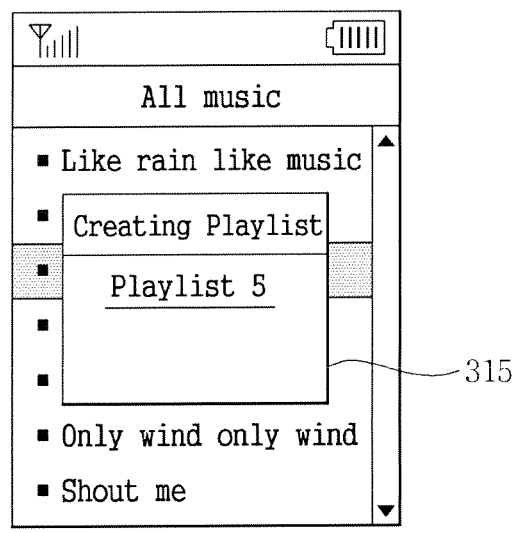
Figure 7D:
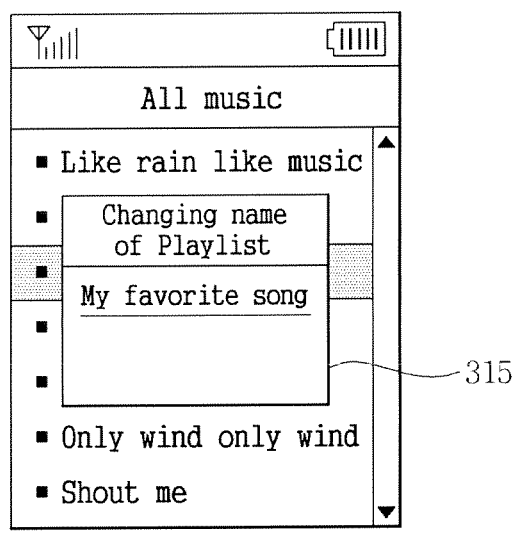

As shown in FIG. 7C, the controller 140 displays a message window 315 with a message of creating a Playlist on the display unit 130 if "Yes" is selected through the input unit 120. The controller creates and names "Playlist 5" and adds the selected files to the created Playlist. As shown in FIG. 7D, the controller 140 controls and changes the Playlist name if "name change" is selected through the input unit 120 in message window 315 of FIG. 7B.

The above implementation is a description of selecting specific files through the input unit 120 and moving the selected specific file to a specific position when all music files are displayed on the display unit 130. However, it is not intended to limit the scope of the present invention.

Figure 8A:
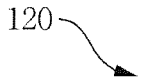
FIGS. 8A and 8B are diagrams illustrating examples of adding files between Playlists according to an embodiment of the present invention.
Figure 8B:
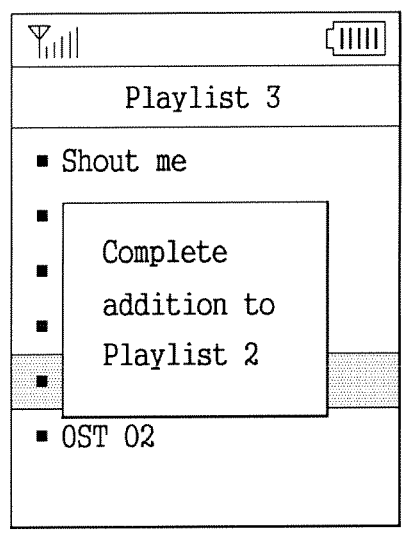

FIGS. 8A and 8B are diagrams illustrating examples of adding contents between Playlists. As shown in FIG. 8A, the display unit 130 displays a list of music files added to "Playlist 3". A numeral key "2" is selected through the input unit 120 when music content "OST 01" is selected.

As shown in FIG. 8B, the controller 140 adds "OST 01", which has already been added to "Playlist 3", to "Playlist 2". After adding "OST 01" to "Playlist 2", the controller 140 may delete "OST 01" from "Playlist 3". This setting may be set by a user.

Figure 9A:
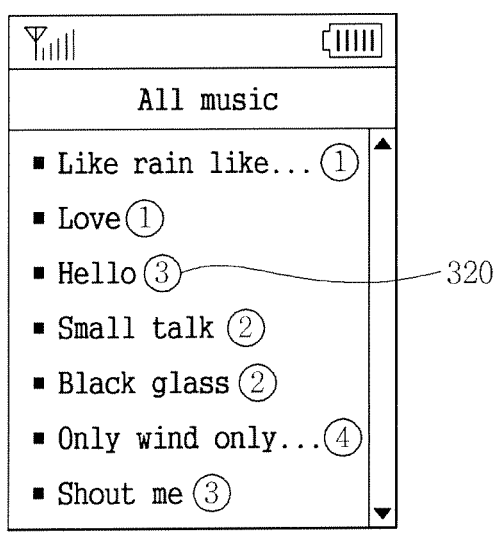
FIGS. 9A and 9B are diagrams illustrating examples of displaying a position to which respective files are currently added according to an embodiment of the present invention.
Figure 9B:
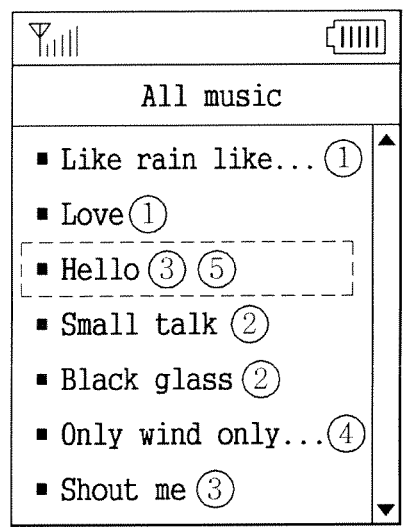

FIGS. 9A and 9B are diagrams illustrating examples of displaying an indicator indicating a position to which respective files are currently added. As shown in FIG. 9A, the controller 140 may display an indicator 320 indicating a position to which respective music files are currently added at one side of all music files displayed on the display unit 130.

For example, the controller 140 displays an indicator 320 "1" for indicating that music files of "like rain like music" and "love" are added to "Playlist 1". The controller 140 displays an indicator 320 "2" for indicating that music files of "small talk" and "black glass" are added to "Playlist 2". The controller 140 also displays an indicator 320 "3" for indicating that music files of "Hello" and "Shout me" are added to "Playlist 3". The controller 140 further displays an indicator 320 "4" for indicating that the music file of "Only wind only wind" is added to "Playlist 4." As shown in FIG. 9B, the controller 140 may display all positions for music files added to two or more Playlists. For example, the controller 140 displays all positions where the music file of "Hello" is added to Playlists "3" and "5".

The above implementations are a description of an embodiment when a file is added to a specific position. In an alternate embodiment a plurality of files may be added to a Playlist.

Figure 10A:
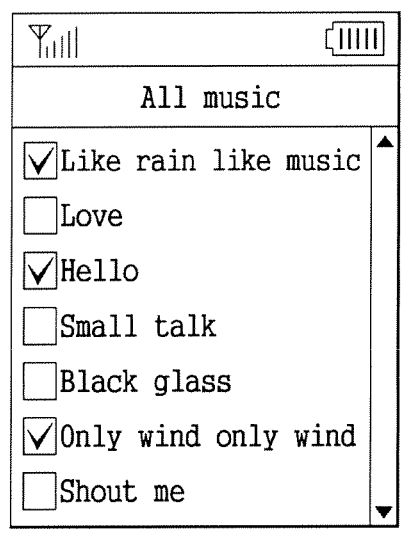
FIGS. 10A and 10B are diagrams illustrating examples of adding a plurality of selected files to a Playlist in response to a specific input signal according to an embodiment of the present invention.
Figure 10A:
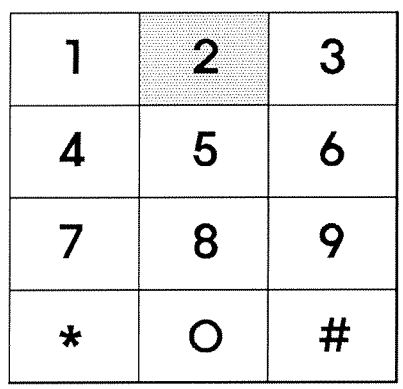
Figure 10B:

FIGS. 10A and 10B are diagrams illustrating examples of adding a plurality of selected files to a Playlist in response to a specific input signal. As shown in FIG. 10A, a plurality of files are selected through the input unit 120 when all music files are displayed on the display unit 130. As shown in FIG. 10B, if numeral key "2" of the input unit 120 is selected, the controller 140 adds the plurality of selected files to "Playlist 2" that corresponds to the numeral key "2".

Adding files to a Playlist refers to adding a name of a file to the Playlist without changing a storage position of the file. However, in an alternate embodiment, a storage position of files may be changed when a file is added to a Playlist.

Figure 11A:
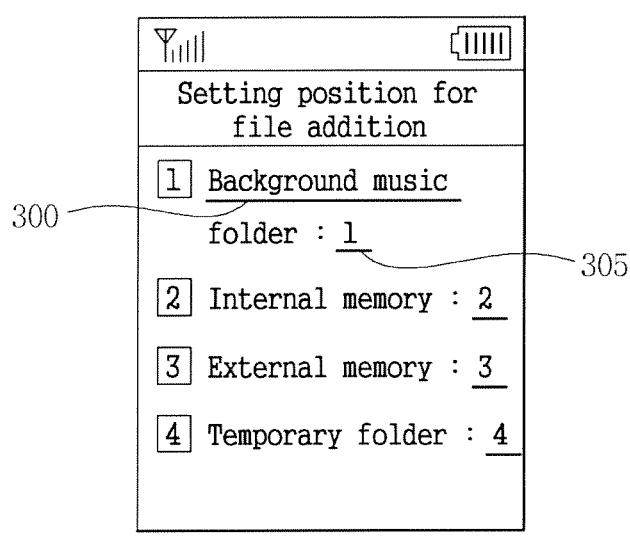
FIGS. 11A and 11B are diagrams illustrating examples of changing a storage position of a file in response to a specific input signal according to an embodiment of the present invention.
Figure 11B:
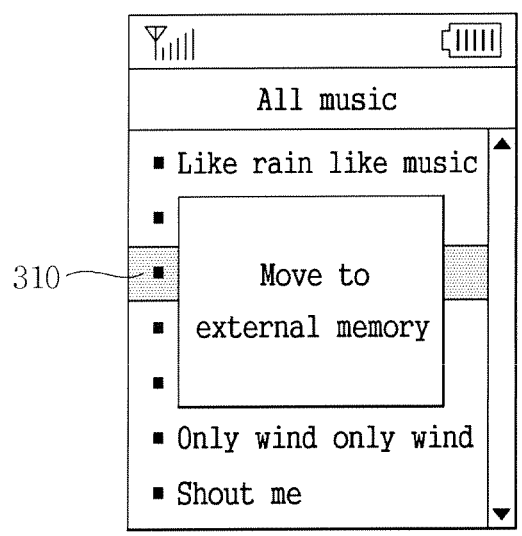

FIGS. 11A and 11B are diagrams illustrating examples of changing a storage position of files in response to a specific input signal. As shown in FIG. 11A, a menu for "setting position for contents addition" is selected through the input unit 120. Accordingly, the controller 140 displays a name of a specific position 300 for file addition on the display unit 130. The controller 140 controls and sets a specific input 305 of the input unit 120 corresponding to the name of the specific position 300.

The specific position 300 may be "1. Background music folder," "2. Internal memory," or "3. External memory." A method of setting the specific input 305 using the input unit 120 is the same as the above description of FIG. 3.

After the specific position 300 is set, the "Hello" music file may be selected through the input unit 120 as shown in FIG. 4A. After selecting the file, if numeral key "3" of the input unit 120 is selected, the controller 140 adds the music file of "Hello" to an external memory that is set to correspond to the numeral key "3".

In one embodiment, adding the "Hello" music file also deletes the music file from an original storage position and added to the external memory. In an alternate embodiment, the "Hello" music file may be copied to the external memory such that an original storage position is maintained. As described above in FIG. 9A, the controller 140 may display a position at which respective contents are currently stored.

The embodiments described above are examples of when a specific position that corresponds to a specific input of the input unit 120 is a Playlist or a storage position. However, it is not intended to limit the scope of the present invention.

Figure 12A:
FIGS. 12A and 12B are diagrams illustrating examples of changing a display position of a file by a specific input according to an embodiment of the present invention.
Figure 12B:

FIGS. 12A and 12B are diagrams illustrating examples of changing a display position of files by a specific input. As shown in FIG. 12A, a list of music files added to "Playlist 3" is displayed on the display unit 130. In the example, when "6. OST 02" is selected, numeral key "1" of the input unit 120 is pressed. As shown in FIG. 12B, the controller 140 may add "6. OST 02" as "1. OST 02," which corresponds to the first music file of "Playlist 3."

The embodiments described above are examples where the content of a file is music. However, it is not intended to limit the scope of the present invention.

Figure 13A:
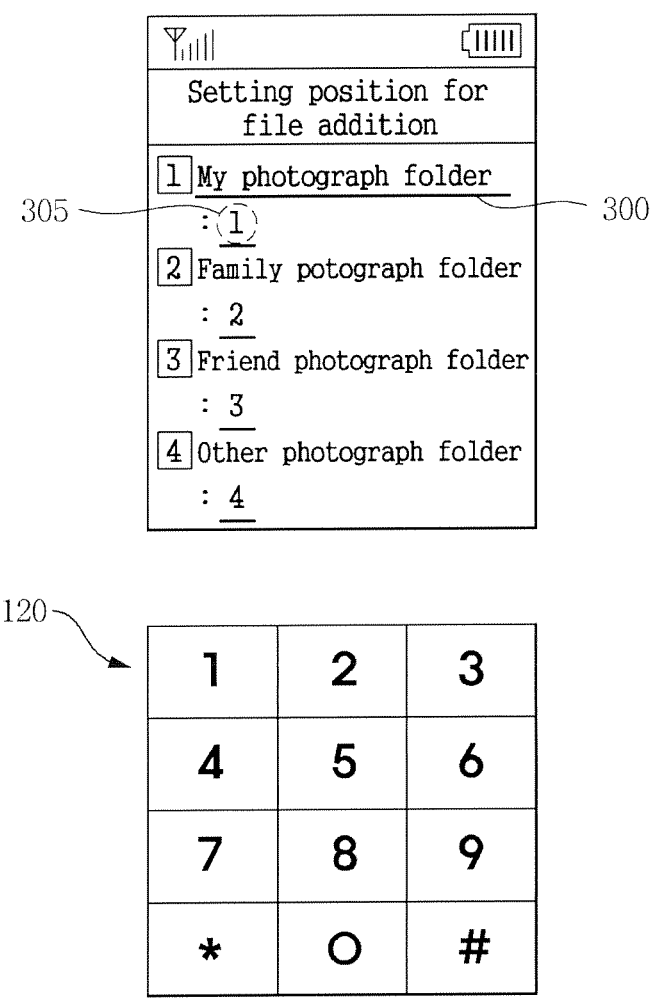
FIGS. 13A to 13C are diagrams illustrating examples of setting a specific position corresponding to a specific input signal where the content is an image according to an embodiment of the present invention.
Figure 13B:
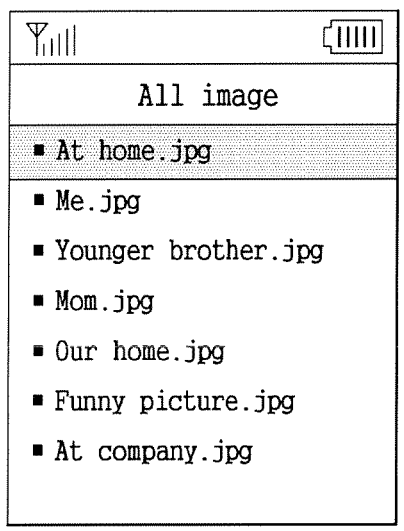
Figure 13C:
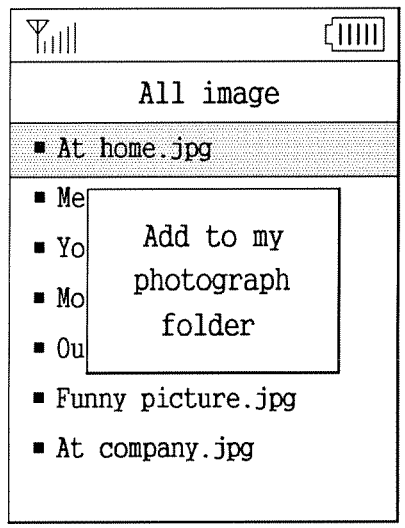

FIGS. 13A to 13C are diagrams illustrating examples of setting a specific position corresponding to a specific input signal in the case of image file. As shown in FIG. 13A, a file may be an image such as a photograph or a picture. The image file may be added to a specific position in the same manner as with the above-described music contents.

In detail, as described with respect to FIG. 3A, a menu for "setting position for file addition" is selected through the input unit 120. Accordingly, the controller 140 displays a name of a specific position 300 for file addition on the display unit 130. The controller 140 controls and sets a specific input 305 of the input unit 120 corresponding to the name of the specific position 300.

The specific position 300 may be a folder such as "1. My photograph folder", "2. Family photograph folder", "3. Friend photograph folder", or "4. Other photograph folders". "Folder" refers to a group of one or more image files, similar to the Playlist described above.

Accordingly, a specific input 305 of the input unit 120 that serves to add contents to a position of "1. My photograph folder" is set as numeral key "1". A specific input 305 of the input unit 120 that serves to add files to a position of "2. Family photograph folder" is set as numeral key "2". A specific input 305 of the input unit 120 that serves to add files to a position of "3. Friend photograph folder" is set as numeral key "3". A specific input 305 of the input unit 120 serving to add files to a position of "4. Other photograph folders" is set as numeral key "4".

As shown in FIG. 13B, a list of all image files stored in the memory unit 110 is displayed on the display unit 130 and an image file, "At home.jpg," is selected, when the specific position corresponding to the specific input is set. After selecting the image file, as shown in FIG. 13C, if numeral key "1" is selected through the input unit 120, the controller 140 adds the image file corresponding to the numeral key "1" to the "My photograph folder." Additionally, as in the above-described music files, image files can be added to a specific position.

The specific input set to a numeral key of the input unit 120 in the above-described examples may be selected for a predetermined time. For example, when a numeral key is selected for "one second" a numeral key corresponding to a specific menu is input and if the numeral key is selected for "two or more seconds," the numeral key may correspond to adding files to a specific position.

Figure 14A:
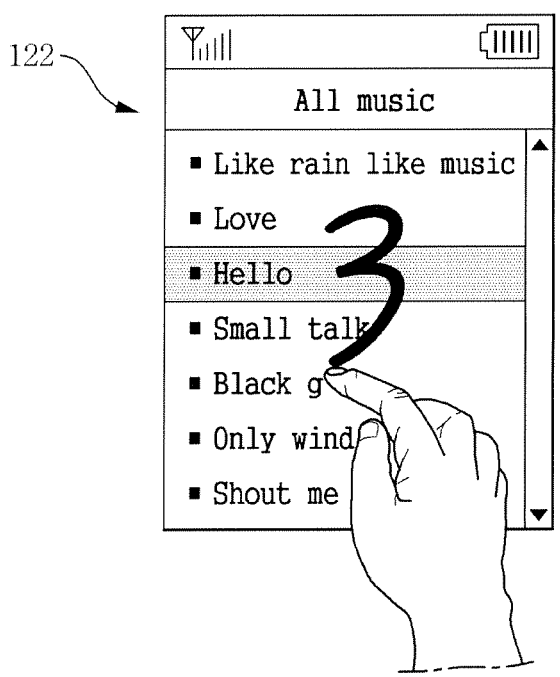
FIGS. 14A to 14C are diagrams illustrating examples of adding files to a specific position where an input unit is a touch type according to an embodiment of the present invention.
Figure 14B:
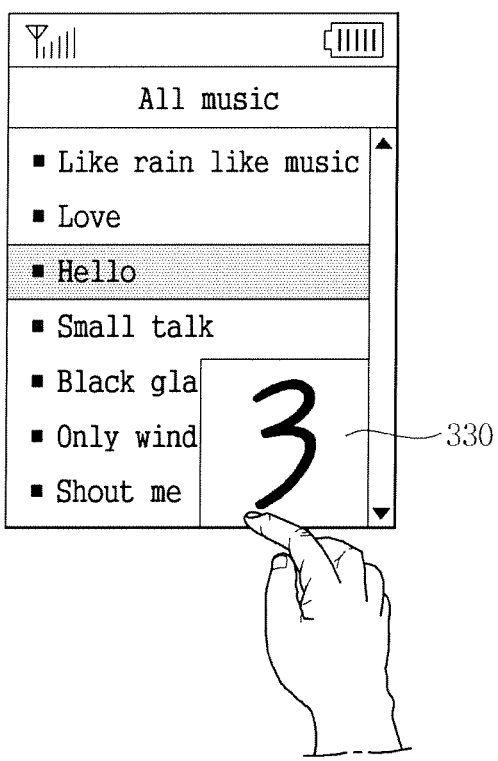
Figure 14C:
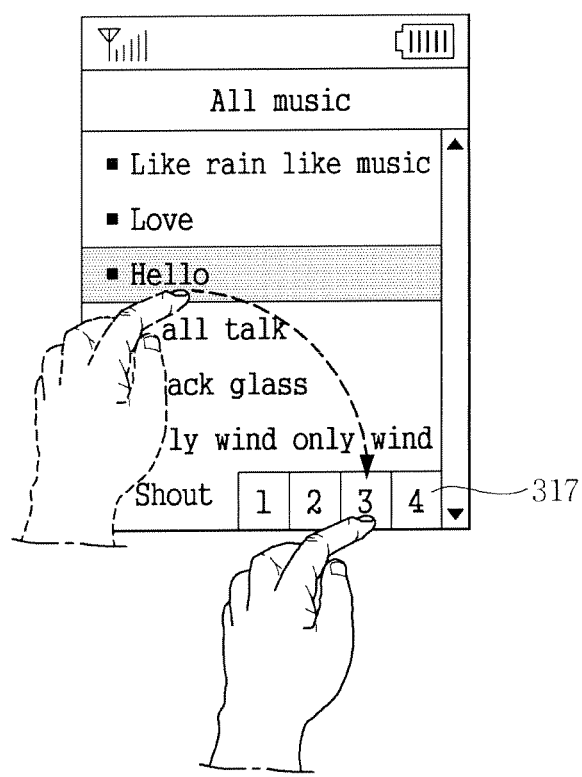

FIGS. 14A to 14C are diagrams illustrating examples of adding files to a specific position using a touch type input unit. As shown in FIG. 14A, the input unit 120 may be a touch type input device such as a touch screen 122. Accordingly, if numeral "3" is input on the touch screen 122 when the "Hello" music file is selected, the controller 140 may add "Hello" to a position set to correspond to numeral "3". As shown in FIG. 14B, if numeral "3" is input to a separate touch input region 330 provided on a touch screen when the "Hello" music file is selected, the controller 140 adds "Hello" to a position set to correspond to the numeral "3". As shown in FIG. 14C, the controller 140 can display an addition position guide 317 at one side of a touch screen when the music contents of "Hello" are selected. Thus, if the music contents of "Hello" are dragged and dropped to a numeral "3" of the addition position guide 317 with being touched, the controller 140 adds the music contents of "Hello" to a position set to correspond to the numeral "3".

Figure 15:
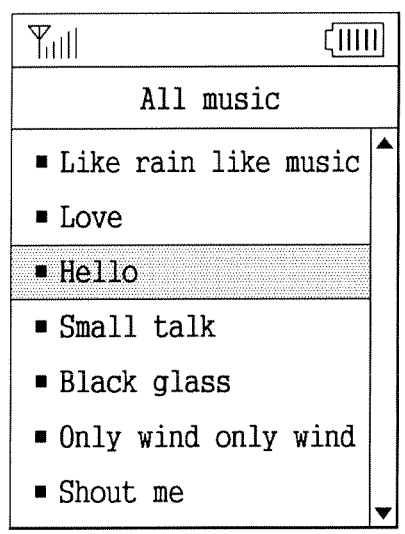
FIG. 15 is a diagram illustrating an example of adding files to a specific position in case where an input unit is a rotary type according to an embodiment of the present invention.
Figure 15:
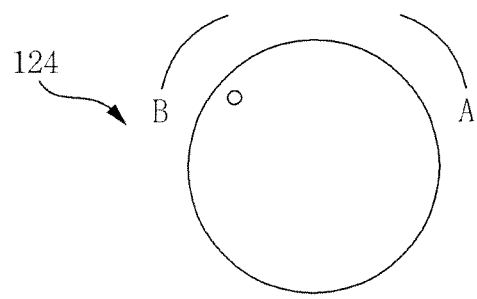

FIG. 15 is a diagram illustrating an example of adding files to a specific position using a rotary type input unit. As shown in FIG. 15, the input unit 120 may be a rotary input device such as a jog disk 124. Accordingly, if jog disk 124 rotates three times in the direction of "B" in a state where the "Hello" music file is selected, the controller 140 may add "Hello" to a position set to correspond to the numeral "3".

If the jog disk 124 revolves in the direction of "A", the next music file, "small talk," may be selected. Alternately, in case where the jog disk 124 rotates three times in the direction of "A" or "B" and the third rotation is made during a time longer by a predetermined time compared to the respective previous first and second rotations, the controller 140 adds the music file of "Hello" to the position set to correspond to the numeral "3". This setting may be changed by the user.

Figure 16:
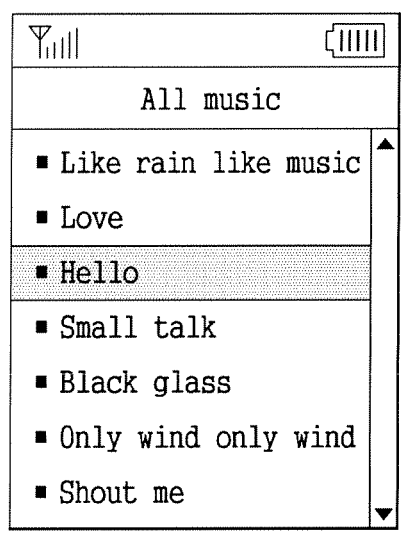
FIG. 16 is a diagram illustrating an example of adding files to a specific position in case where an input unit is a stick type according to an embodiment of the present invention.
Figure 16:
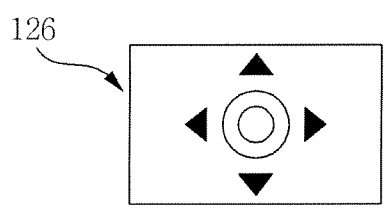

FIG. 16 is a diagram illustrating an example of adding files to a specific position using a stick type input unit. As shown in FIG. 16, the input unit 120 may be a stick type input device such as a jog stick 126. If the jog stick 126 rotates three times to the right when the "Hello" music file is selected, the controller 140 adds "Hello" to a position set to correspond to "three times" in the right direction. The direction of movement of the jog stick 126 may be set and changed. The stick type input device may be any stick type input device that is movable in several directions, such as in two directions or five directions as well as the four directions shown in FIG. 16.

In the embodiments discussed above, files are added to a Playlist or a storage position. However, it is not intended to limit the scope of the present invention. In an alternate embodiment of the present invention, files may be added to a Playlist while simultaneously changing a storage position.

In the embodiments discussed above, specific selected files, such as an image or a music file, may be played. Even when a plurality of specific contents are selected, any one or more of the specific contents can be played.

The above embodiments are a description of a method for adding files in a mobile terminal 10. However, the present invention may also be applied to other types of electronic devices. Examples of such devices include a portable device, a digital broadcast receiving terminal, an MP3 player, a personal digital assistant (PDA), and a portable multimedia player (PMP). Additionally, music files may be provided in any electronic equipment including a mobile terminal 10 which may produce sound.

Furthermore, the present invention is applicable to all types of files available for electronic equipment. Examples of other types of files to which the present invention is applicable are a moving picture, a game, or a document in addition to music and image files.

As described above, the present invention increases user convenience because specific contents are promptly and rapidly added to a set position.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for managing files of a mobile terminal, the method comprising:
    entering a setting mode configured to receive a location identifier corresponding to an input key of an input unit of the mobile terminal;
    receiving a first input via a first input key of the input unit in the setting mode;
    associating a first file location for saving a file with a first location identifier in response to the first input received via the input unit;
    detecting selection of a first file from a displayed file list;
    detecting a second input received via the input unit when the first file is selected;
    adding the selected first file to the first file location associated with the first location identifier in response to the detected second input which corresponds to the first location identifier;
    detecting selection of a second file from the displayed file list;
    receiving a third input via the input unit when the second file is selected;
    generating a new file location in response to the third input which does not correspond to a specific location identifier associated with a specific file location; and
    adding the selected second file to the new file location.

2. The method of claim 1, wherein the first file location comprises a Playlist or a memory location.

3. The method of claim 1, wherein the displayed file list comprises a plurality of file items with corresponding location identifiers.

4. The method of claim 1, wherein the input device comprises at least a keypad or a touch screen.

5. The method of claim 1, wherein the displayed file list comprises multimedia files.

6. The method of claim 1, wherein the second input comprises dragging and dropping the selected first file to the first location identifier.

7. The method of claim 1, wherein the input unit comprises a touch screen and the second input comprises a contact on the touch screen.

8. The method of claim 1, further comprising associating a new location identifier with the new file location.

9. The method of claim 1, further comprising:
    displaying a file location list including at least one file location to which the selected first file can be added when the first file is selected,
    wherein the file location list comprises at least one name of the at least one file location.

10. The method of claim 1, further comprising:
    displaying an indicator indicating a file location in the file list to which files are currently added.

11. A mobile terminal comprising:
    a display unit configured to display a file list;
    an input unit configured to:
        receive a first input for associating a first file location for saving a file with a first location identifier corresponding to a first input key on the input unit;
        receive a user input for selecting a first file or a second file from the displayed file list;
        receive a second input when the displayed first file has been selected; and
        receive a third input when the displayed second file has been selected;
    a memory unit configured to store the at least first or second file and the first location identifier; and
    a controller configured to:
        add the selected first file to the first file location associated with the first location identifier in response to the second input which corresponds to the first location identifier;
        generate a new file location in response to the third input which does not correspond to a specific location identifier associated with a specific file location; and
        add the selected second file to the new file location.

12. The mobile terminal of claim 11, wherein the input unit comprises at least a keypad or a touch screen.

13. The mobile terminal of claim 12, wherein the keypad comprises at least a stick type input or a rotary type input.

14. The mobile terminal of claim 11, further comprising a transceiving unit configured to communicate with another terminal.

15. The mobile terminal of claim 11, wherein the first file location comprises a Playlist or a memory location.

16. The method of claim 10, wherein the indicator comprises at least one location identifier.

17. The mobile terminal of claim 11, wherein the controller is further configured to display a file location list including at least one file location to which the selected first file can be added when the first file is selected, the file location list comprising at least one name of the at least one file location.

18. The mobile terminal of claim 11, wherein the controller is further configured to display an indicator indicating a file location in the file list to which files are currently added.

19. The mobile terminal of claim 18, wherein the indicator comprises at least one location identifier.

* * * * *